US012294836B2

(12) United States Patent
Petersen et al.

(10) Patent No.: US 12,294,836 B2
(45) Date of Patent: May 6, 2025

(54) REMOTE MICROPHONE FOR A HEARING AID

(71) Applicant: Oticon A/S, Smørum (DK)

(72) Inventors: Svend Oscar Petersen, Smørum (DK); Ross Harvey, Smørum (DK)

(73) Assignee: OTICON A/S, Smørum (DK)

( * ) Notice: Subject to any disclaimer, the term of this patent is extended or adjusted under 35 U.S.C. 154(b) by 281 days.

(21) Appl. No.: 17/955,946

(22) Filed: Sep. 29, 2022

(65) Prior Publication Data

US 2023/0109167 A1 Apr. 6, 2023

(30) Foreign Application Priority Data

Sep. 29, 2021 (EP) .................................... 21199668

(51) Int. Cl.
*H04R 25/00* (2006.01)
*H04R 1/08* (2006.01)
*H04R 1/10* (2006.01)

(52) U.S. Cl.
CPC ........... *H04R 25/554* (2013.01); *H04R 1/083* (2013.01); *H04R 1/1041* (2013.01);
(Continued)

(58) Field of Classification Search
CPC .... H04R 25/554; H04R 1/083; H04R 1/1041; H04R 25/407; H04R 25/43; H04R 2225/51; H04R 2225/61; H04R 2420/07
See application file for complete search history.

(56) References Cited

U.S. PATENT DOCUMENTS 7,006,846 B2 2/2006 Stratmoen et al.
2003/0222755 A1* 12/2003 Kemper ............ G07C 9/00944 340/5.61
(Continued)

FOREIGN PATENT DOCUMENTS

EP 3057340 A1 8/2016
EP 3255902 A1 12/2017
(Continued)

OTHER PUBLICATIONS

Extended European Search Report for Eurpoean Application No. 22198510.4, dated Feb. 20, 2023.
(Continued)

*Primary Examiner* — Carolyn R Edwards
*Assistant Examiner* — Julie X Dang
(74) *Attorney, Agent, or Firm* — Birch, Stewart, Kolasch & Birch, LLP

(57) ABSTRACT

A remote microphone device for a hearing aid system comprises a multitude of microphones providing a corresponding multitude of electric input signals; a digital signal processor for providing a processed signal in dependence of said multitude of electric input signals. The processor comprises a noise reduction system comprising at least one beamformer for providing a spatially filtered signal. The remote microphone device further comprises a wireless communication interface comprising antenna and transceiver circuitry allowing the remote microphone device to transmit said processed signal comprising said spatially filtered signal or a further processed version thereof to said hearing aid system; a rechargeable battery; a casing having a planar structure with a form and size as a standard credit card; and a user interface configured to allow the user to control functionality of the remote microphone device. The
(Continued)

invention may e.g. be used in hearing aid systems or headsets.

19 Claims, 8 Drawing Sheets

(52) U.S. Cl.
CPC ........... *H04R 25/407* (2013.01); *H04R 25/43* (2013.01); *H04R 2225/51* (2013.01); *H04R 2225/61* (2013.01); *H04R 2420/07* (2013.01)

(56) References Cited

U.S. PATENT DOCUMENTS

| | | | | |
|---|---|---|---|---|
| 2009/0010462 | A1* | 1/2009 | Ekchian | H02J 7/0029 320/137 |
| 2012/0020503 | A1* | 1/2012 | Endo | H04R 25/407 381/312 |
| 2013/0034241 | A1 | 2/2013 | Pandey et al. | |
| 2014/0086417 | A1* | 3/2014 | Hansen | H04R 25/00 381/23.1 |
| 2016/0071506 | A1* | 3/2016 | Qutub | H04R 1/086 381/354 |
| 2016/0155453 | A1* | 6/2016 | Harvey | H04S 1/002 381/26 |
| 2016/0259374 | A1* | 9/2016 | Breiwa | H01F 7/0247 |
| 2017/0048625 | A1* | 2/2017 | Salmon | H04R 19/005 |
| 2017/0164084 | A1* | 6/2017 | Vitt | H04R 1/08 |
| 2017/0180882 | A1* | 6/2017 | Lunner | H04R 25/558 |
| 2017/0230758 | A1* | 8/2017 | Kuntzman | H04R 19/04 |

FOREIGN PATENT DOCUMENTS

| | | | | |
|---|---|---|---|---|
| EP | 3716642 | A1 | 9/2020 | |
| WO | WO94/20951 | A1 | 9/1994 | |
| WO | WO2007/070508 | A2 | 6/2007 | |
| WO | WO2007/070508 | A3 | 6/2007 | |
| WO | WO2007/143670 | A2 | 12/2007 | |
| WO | WO2007/143670 | A3 | 12/2007 | |
| WO | WO-2021142290 | A2 * | 7/2021 | G01C 21/206 |

OTHER PUBLICATIONS

Search Report issued in European priority application 21199668.1, dated Mar. 23, 2022.

* cited by examiner

REMOTE MICROPHONE FOR A HEARING AID

TECHNICAL FIELD

The present disclosure relates to hearing aids, e.g. to a remote microphone configured to communicate with a hearing aid.

WO1994020951A1 discloses a credit card size audio record and playback device. U.S. Pat. No. 7,006,846 discloses credit card size communication system comprising a battery, a microphone an antenna and a transmitter or transceiver.

SUMMARY

Hearing aid systems may include one or more remote microphones wirelessly connected to the hearing aid(s) worn by a hearing impaired user. These remote microphone(s) may e.g. include:

- A partner microphone that the user's communication partner wears so the user better can hear the partner's voice.
- A teacher microphone worn by a teacher of the user that can help a hearing impaired student to better hear the teacher.
- A table microphone array, usually used in meeting to do better beamforming to suppress unwanted noise.

Many of these remote microphones can significantly improve the SNR for the hearing impaired, but they also introduce problems for the user:

- The remote microphone is an extra device that the user needs to bring along, and hard to store in the pocket or a bag. Where should the user keep it when not using it?
- The remote mic can be an alien device that is not discreet to use, especially if the user needs to ask another person to wear it.
- Usability of the remote mic can be challenging, including charging, connecting, LED feedback, multiple buttons.
- The performance can be challenging especially if the wireless connection and signal processing adds latency to the transmitted signal compared to the directly transmitted audio signal.

A Microphone Device:

In an aspect of the present application, there is provided a remote microphone device for a hearing aid system is provided. The remote microphone device comprises

- a multitude of microphones, each providing an electric input signal representing sound in the environment of the microphone device, thereby providing a corresponding multitude of electric input signals;
- a digital signal processor for providing a processed signal in dependence of said multitude of electric input signals, the processor comprising a noise reduction system comprising
- at least one beamformer for providing a spatially filtered signal in dependence of
  - said multitude of electric input signals, or signals originating therefrom; and
  - beamformer filter coefficients, said beamformer filter coefficients being determined in dependence of a steering vector comprising as elements respective acoustic transfer functions from a target signal to each of said multitude of input transducers or acoustic transfer functions from a reference input transducer among said multitude of input transducers to each of the remaining input transducers;

- a wireless communication interface comprising antenna and transceiver circuitry allowing the remote microphone device to transmit said processed signal comprising said spatially filtered signal or a further processed version thereof to said hearing aid system; and
- a rechargeable battery.

The remote microphone device may further comprise a casing having a planar structure with a form and size (approximately) as a standard credit card. The remote microphone device may further comprise a user interface configured to allow the user to control functionality of the remote microphone device.

Thereby a user-friendly remote microphone may be provided.

The casing of the remote microphone device encloses the electronic (and possible other) components and the rechargeable battery of the device. The casing has a planar form comprising two parallel surfaces of dimension as a standard credit card and a dimension (thickness) perpendicular to the two planar opposing surfaces that is much smaller than planar dimensions of the device, e.g. ≤3.0 mm, such as ≤2.0 mm.

The casing may be arranged to have a dimension of less than (or equal to) 2 mm in a direction perpendicular to its planar surfaces.

The planar form and size refer to the extension of the credit card size device in a plane (e.g. an x, y plane of an orthogonal coordinate system). The standard credit card according to ISO/IEC 7810, Size ID-1 is 85.6 mm×53.98 mm, e.g. x=53.98 mm, y=85.6 mm. The planar structure with a form and size approximately as a standard credit card may e.g. have dimensions x=53.98 mm+/−5%, y=85.6 mm+/−5% and z≤2 mm. The tolerances in the planar directions (x,y) may be tighter than +/−5%, e.g. +/−2%, such as +/−1%.

The user interface may be configured to allow a user to turn the remote microphone device on and/or off.

The user interface may be configured to allow a user to switch between omni and directional modes of operation of the beamformer.

The beamformer may comprise a memory, wherein beamformer filter coefficients of said at least one beamformer are stored. The beamformer filter coefficients of said at least one beamformer may be configured to implement one or more beamformers, e.g. one or more beamformers that have maximum sensitivity in one or more directions perpendicular to the sides of the credit card form remote microphone device.

The beamformer filter coefficients may be time-invariant (thereby implementing a fixed beamformer for enhancing sounds in one direction (fixed in relation to the orientation of the remote microphone device, e.g. perpendicular to one of the sides of the credit card form of the remote microphone device).

The beamformer filter coefficients may be adaptively updated (thereby implementing an adaptive beamformer, which may enhance speakers in any direction, and/or suppress noise in the environment, while maintaining a fixed 'target direction').

The multitude of microphones may comprise one or more (or two or more) MEMS microphones allowing easy connection to the digital signal processor. The multitude of microphones may consist of MEMS microphones.

The user interface may comprise one or more activation elements. The user interface may comprise a button, preferably providing a tactile feedback. The one or more activation elements may comprise one or more buttons, e.g.

based on a capacitive touch, a capacitive finger swipe, or a dome switch. The button may e.g. comprise a dome switch providing a tactile feedback.

The user interface may comprise a voice control interface allowing the user to control the functionality of the remote microphone device by spoken commands. The voice control interface may be based on a command word detector configured to identify a limited number of spoken commands.

The user interface may comprise one or more indicators for providing feedback to the user about a current status of the remote microphone device. The one of more indicators may comprise one or more light emitting diodes. The one of more indicators may comprise a (low-power) display. The one of more indicators may comprise an acoustic output transducer, e.g. a buzzer (e.g. a piezo buzzer) or a loudspeaker. At least one of the one or more indicators may be located on the same (planar) surface of the casing of the remote microphone device as the one or more activation elements. An indicator (e.g. an LED) may e.g. be located on the same surface as an activation element, e.g. a button comprising dome switch, e.g. within 20 mm of each other.

At least some (e.g. two, such as all) of the multitude of microphones may be located in corners of the (casing of the) standard credit card form of the remote microphone device. The multitude of microphones may e.g. comprise an array of microphones, e.g. comprising four or more microphones. The microphones may be distributed in the planar form of the remote microphone device to provide an appropriate mutual distance between the microphones, e.g. one in each corner of the credit card size remote microphone device. The appropriate distance may be selected with a view to the applications that the remote microphone device is designed for (e.g. beamforming that allows a) focusing on particular persons around a table (in particular distance from the microphone device to the person to be focused on), b) focusing on a person's mouth when worn by said person, etc.

The remote microphone device may comprise two microphones (mic) having a microphone direction along the longest side of the casing of the device. In other words, the microphone axis of the two microphones is parallel to the longest side of the casing (cf. e.g. FIG. 7A). Thereby, a beamformer of the remote microphone device (RMC) may be arranged to provide its maximum sensitivity in a direction parallel to the longest side ('y', cf. above) of the casing, whereby the remote microphone device may be easily oriented to pick up sound from a known direction (e.g. the users voice by arranging the device (e.g. in a shirt pocket) so that it 'points' in a direction of the user's mouth), or in a direction of a currently speaking person (or other localized sound source).

The remote microphone device may comprise a sensor allowing to detect an orientation of the remote microphone device. The sensor may comprise a movement sensor, e.g. an accelerometer (e.g. a 2D or 3D accelerometer). The sensor may comprise gyroscope (e.g. a 2D or 3D gyroscope).

The remote microphone device may be configured determine a current mode of operation in dependence of the detected orientation of the remote microphone device (e.g. a current mode of orientation of the beamformer).

The remote microphone device may be configured to determine an orientation of the device relative to the force of gravity of the earth. The remote microphone device may be configured to enter a directional mode of operation in case its planar orientation is parallel to the force of gravity of the earth. The remote microphone device may be configured to enter an omni-directional mode of operation in case its planar orientation is perpendicular to the force of gravity of the earth.

The remote microphone device may be configured to determine which of the two planar surfaces (x,y) of the device is presently facing upwards (when the device is resting on a planar carrier, e.g. a table). This is e.g. of interest when functionality of the remote microphone device is provided only from one of the sides, e.g. if the activation element (e.g. a dome switch button) is accessible from one surface and the microphone inlets are located on the opposite surface of the device. Such functionality may e.g. be provided by an accelerometer having a preferred direction in a direction perpendicular to the planar surfaces of the remote microphone device.

The remote microphone device may be configured to exchange information with a further remote device (in addition to the hearing aid). The further remote device may e.g. be or comprise a remote control device of the hearing aid system, e.g. a smartphone via the wireless communication interface. The hearing system may comprise a user interface for controlling the hearing system when implemented as an APP of a smartphone. The APP-based user interface may be configured to allow the user to search for the remote microphone device if out of sight (e.g. lost). The remote microphone device may be configured to support a BLE beacon tracking feature for easy localization if the remote microphone device is lost. The remote microphone device may be configured to issue a sound (e.g. buzz or beep of other sounds) upon request from the APP-based user interface.

Each of the multitude of microphones may be mounted in a suspension comprising a flexible material in a cavity or opening in the credit card size casing of the remote microphone device.

The multitude of microphones may be arranged in the remote microphone device to have their inlets on a selected one of the two planar surfaces of the casing. The selected side may e.g. be the opposite side of the one from which the user interface (e.g. a push button) is accessible. The function of the device may be anonymized.

Microphone inlets of the multitude of microphones may (each or together) be covered with a filter and/or a membrane on both sides of the credit card formed casing of the remote microphone device. Preferably, a membrane for providing an acoustically transparent closure is used. The membrane may be placed away from one of the planar surfaces of the casing, e.g. on a substrate (e.g. a PCB) where microphones (e.g. MEMS microphones) are located. The membrane may be applied directly to a surface of the MEMS microphone, where the microphone inlet is located.

The microphones may be mounted on the substrate (e.g. a PCB) to have a microphone inlet opening facing a first surface of the substrate, and wherein the substrate comprises an (e.g. larger) opening concentrical with the microphone inlet opening, and wherein the membrane is placed on the opposite (second) surface of the substrate covering said opening in the substrate.

The casing of the remote microphone device may be arranged to be hermetically closed, e.g. to provide a water-tight (e.g. water resistant, or water proof) device, e.g. according to a standard, e.g. IP67, or IP68, or IP69. The remote microphone device may be provided with membranes on the devices to prevent the penetration of liquids into the device (in particular to the electronic components of the device).

The remote microphone device may comprise a PCB whereon electronic components of the device are mounted. The (majority, or all, of the) electronic components may be mounted on one surface of the PCB only (to minimize its thickness).

The remote microphone device comprises a rechargeable battery, e.g. a wirelessly rechargeable battery, e.g. for recharging the battery according to a standard or proprietary scheme for fast charging, e.g. Qi.

The rechargeable battery and the (majority, or all, of the) electronic components mounted on the surface of the PCB may occupy complementary planar areas in the casing of the remote microphone device. A sole exception may be the charging coil (which may be located on the battery casing, when appropriately electrically insulated and electromagnetically shielded from the battery housing). The charging coil may be located on the battery, separated from a battery housing by an electromagnetically shielding layer. The charging coil may be located on a substrate (e.g. a PCB) extending over (or under) the battery wherein the PCB comprises an electromagnetically shielding layer for shielding the battery housing from electromagnetic radiation during charging.

The remote microphone device may comprise a charging coil configured to wirelessly receive charging energy from an external charging device allowing said charging coil to charge said rechargeable battery. The charging coil may be implemented on a printed circuit board (PCB). The battery and the charging coil may be arranged in the same area of the planar structure of the credit card form remote microphone device (cf. e.g. FIG. 2).

The remote microphone device may comprise a charge management circuit for controlling the charging of the rechargeable battery. The wireless charging may be resonant charging.

Charging of the remote microphone device may be arranged as contact charging, e.g. in a card holder size charging device, e.g. charged using an USB cable, or similar technology.

The remote microphone device may comprise a directional microphone system (e.g. a beamformer) adapted to spatially filter sounds from the environment, and thereby to 'enhance' a target acoustic source relative to a multitude of other acoustic sources in the local environment of the remote microphone device. The directional system may be adapted to detect (such as adaptively detect) from which direction a particular part of the microphone signal originates. This can be achieved in various different ways as e.g. described in the prior art. In audio devices, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The remote microphone device may comprise a 'forward' (or 'signal') path for processing an audio signal between an input and an output of the remote microphone device. A signal processor may be located in the forward path. The signal processor may be adapted to provide a frequency dependent gain according to a user's particular needs (e.g. hearing impairment). The remote microphone device may comprise an 'analysis' path comprising functional components for analyzing signals and/or controlling processing of the forward path. Some or all signal processing of the analysis path and/or the forward path may be conducted in the frequency domain, in which case the remote microphone device comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The remote microphone device may comprise an analogue-to-digital (AD) converter to digitize an analogue input (e.g. from an input transducer, such as a microphone) with a predefined sampling rate, e.g. 20 kHz. The remote microphone devices may comprise a digital-to-analogue (DA) converter to convert a digital signal to an analogue output signal, e.g. for being presented to a user via an output transducer.

The remote microphone device, e.g. the input unit, and or the antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the remote microphone device from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the remote microphone device may be split into a number NI of frequency bands (e.g. of uniform width), where NI is e.g. larger than 5, such as larger than 10, such as larger than 50, such as larger than 100, such as larger than 500, at least some of which are processed individually. The remote microphone device may be adapted to process a signal of the forward and/or analysis path in a number NP of different frequency channels (NP≤NI). The frequency channels may be uniform or non-uniform in width (e.g. increasing in width with frequency), overlapping or non-overlapping.

The remote microphone device may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the remote microphone device is reduced (e.g. to save power), e.g. to disable wireless communication, and/or to disable specific features of the remote microphone device.

The remote microphone device may comprise a number of detectors configured to provide status signals relating to a current physical environment of the remote microphone device (e.g. the current acoustic environment), and/or to a current state or mode of operation of the remote microphone device. Alternatively, or additionally, one or more detectors may form part of an external device in communication (e.g. wirelessly) with the remote microphone device. An external device may e.g. comprise the hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The remote microphone device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The remote microphone device may comprise an own voice detector for estimating whether or not (or with what probability) a given input sound (e.g. a voice, e.g. speech) originates from the voice of the user of the system. A microphone system of the remote microphone device may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The remote microphone device may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the remote microphone device, or other properties of the current environment than acoustic);
b) the current acoustic situation (input level, feedback, etc.), and
d) the current mode or state of the remote microphone device (program selected, time elapsed since last user interaction, etc.) and/or of another device in communication with the remote microphone device.

The classification unit may be based on or comprise a neural network, e.g. a trained neural network.

The remote microphone device may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal. Feedback in the remote microphone device may e.g. occur when the unit is placed in a pocket otherwise located near a reflecting surface. The problem of feedback depends on the output transducer and its location relative to the microphones of the remote microphone device.

Use:

In an aspect, use of a remote microphone device as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Hearing Aid System:

In a further aspect, a hearing aid system comprising at least one hearing aid and a remote microphone device as described above, in the 'detailed description of embodiments', and in the claims is moreover provided.

The at least one hearing aid may comprise first and second hearing aids of a binaural hearing aid system. The hearing aid system may constitute a binaural hearing aid system. The hearing aid system may be configured to allow a wireless link to be established between the at least one hearing aid and the remote microphone device.

The hearing aid system may be adapted to establish a communication link between the at least one hearing aid and an auxiliary device to provide that data can be exchanged or forwarded from one to the other. The hearing aid system may be configured to allow that the communication link enables the transmission of control, status signals, and/or audio signals. The communication link may be an audio communication link, e.g. based on Bluetooth or Bluetooth Low-Energy, e.g. Bluetooth LE Audio (or functionally similar technology).

The hearing aid system may be configured to allow that the control of the remote microphone device, e.g. power-on or power-off, can be performed based on control signals received from the auxiliary device. The communication link to the auxiliary device may be based on the wireless communication interface of the remote microphone device. The auxiliary device may be configured to control the hearing aid system (optionally including the remote microphone device) via an APP.

The hearing aid system may comprise a user interface for controlling the hearing aid system. The user interface may be implemented in the auxiliary device. The hearing aid system, including the (possibly APP-based) user interface, may be configured to allow the user to control functionality of the remote microphone device. The hearing aid system may be configured to implement the user interface for the remote microphone device in the auxiliary device, e.g. allowing to turn the remote microphone device on or off, and/or to control the at least one beamformer of the remote microphone device.

The hearing aid system may comprise the auxiliary device.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

A Hearing Aid:

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology, such as Bluetooth LE Audio), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may further comprise other relevant functionality for the application in question, e.g. compression, noise reduction, feedback control, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

An App:

In a further aspect, a non-transitory application, termed an APP, is furthermore provided by the present disclosure. The APP comprises executable instructions configured to be executed on an auxiliary device to implement a user interface for a hearing aid or a hearing aid system (e.g. including the remote microphone device) described above in the 'detailed description of embodiments', and in the claims. The APP may be configured to run on cellular phone, e.g. a smartphone, or on another portable device allowing communication with said hearing aid or said hearing system.

The APP (and other parts of the hearing aid system) may be adapted to allow the user to configure the remote microphone device (RMC) via the APP (cf. e.g. Remote Mic APP in FIG. 5B). The user may e.g. switch the remote microphone device on or off. The user may e.g. further select activation of beamforming. The user may when directional system is activated select directions relative to the credit card form of the (housing of the) remote microphone device in which (e.g. fixed) beamformers should be directed. The user may (instead of beamforming) select an 'Omni' directional mode of operation of the remote microphone device. The Remote Mic APP may e.g. be offered as an alternative (or in addition) to activation elements located on the remote microphone device (RMC).

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids. The disclosure relates e.g. to a remote microphone configured to communicate with a hearing aid.

Figure 1:
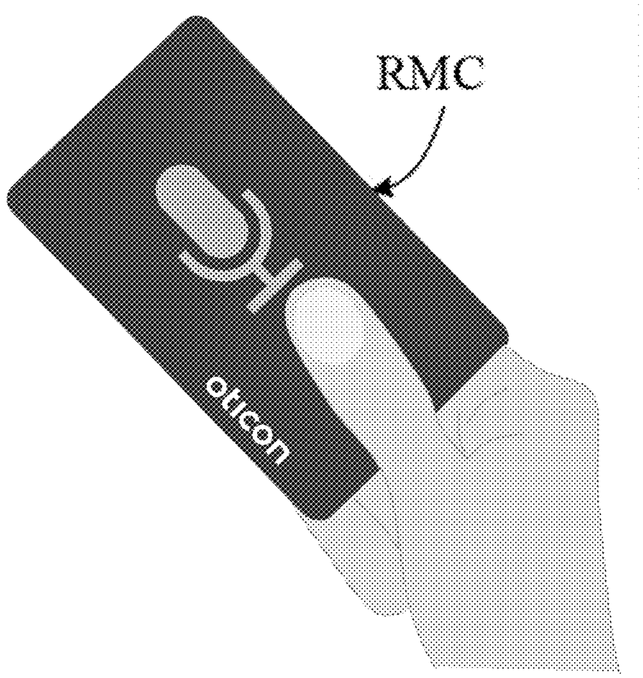
FIG. 1 schematically shows an outer appearance of a credit card size remote microphone device according to an embodiment of the present disclosure, FIG. 2 schematically shows a block diagram of a credit card size remote microphone device according to an embodiment of the present disclosure.

FIG. 1 shows an outer appearance of a credit card size remote microphone device (RMC) according to an embodiment of the present disclosure.

The present disclosure proposes a small wireless remote microphone array in the (planar) size equal to or similar to (e.g. within +/−5%, or less) a standard credit card (ISO/IEC 7810 Size ID-1; 85.6×53.98 mm). It may e.g. have a larger thickness, twice the thickness of a standard credit card (e.g. 1.0-2.0 mmm). The microphone device may be referred to as a Remote Mic Card (RMC). The RMC may include one or more (such as a majority or all) of the following features:

- At least on, preferably, two or more microphones for picking up sound.
- A signal processor enabling noise reduction and/or beamforming on the picked-up sound signal(s). Signal processing may include Voice Activity Detection, e.g. so that a signal is only transmitted from the RMC, if voice activity is present in the captured signal(s).
- A wireless transmitter that can transmit the cleaned up (spatially filtered and/or noise reduced) signal to the user's hearing aid(s). The wireless transmission may e.g. include Classic Bluetooth, Bluetooth Low-Energy (BLE), e.g. Bluetooth LE Audio, Ultra-Wide-Band (UWB) or a proprietary wireless connection designed for low power and low latency to the hearing aids. UWB resides in a different frequency range (3-11 GHz) than Bluetooth (2.4-2.5 GHz)) and has a low latency. Although commercially enabled, no standard for audio transmission has yet been agreed on for UWB.
- A wireless charging coil. The wireless charging may e.g. be Qi-charger (or other (e.g. resonant) charging technology) compatible to enable charging on standard wireless chargers.
- As an alternative to wireless charging, wired connection to charging pads/terminals may also be a solution. The charging pad interface may e.g. be provided according to the general ISO/IEC 7816 standard for electronic identification cards and payment card. The terminals may alternatively be arranged in any other locations on the card.—One or more buttons (e.g. capacitive touch, capacitive finger swipe, dome switch), used for turning on device and/or select a directional mode of a beamformer and optionally for remotely controlling the hearing aid(s).
- One or more LEDs for visual feedback to the user as indication of on/off status and/or settings for beamformer mode (omni or directional mode).
- An accelerometer to automatically detect whether the card is lying flat on a table, held in a hand, or being worn in upright position by a user (or communication partner).
- A buzzer (or loudspeaker) for acoustical feedback to the user (may e.g. be used to find a lost card (RMC)).

An advantage of the format of the RMS is that its planar dimension (e.g. of a credit card) facilitates beamforming (allowing a relatively large distance between microphones (e.g. in a two-dimensional plane), thereby improving low-frequency performance (e.g. narrower beams) of the beamformer).

Another advantage of the form factor is easier storage, e.g. in a wallet, in a smartphone cover, in a pocket and/or bag.

Figure 2:
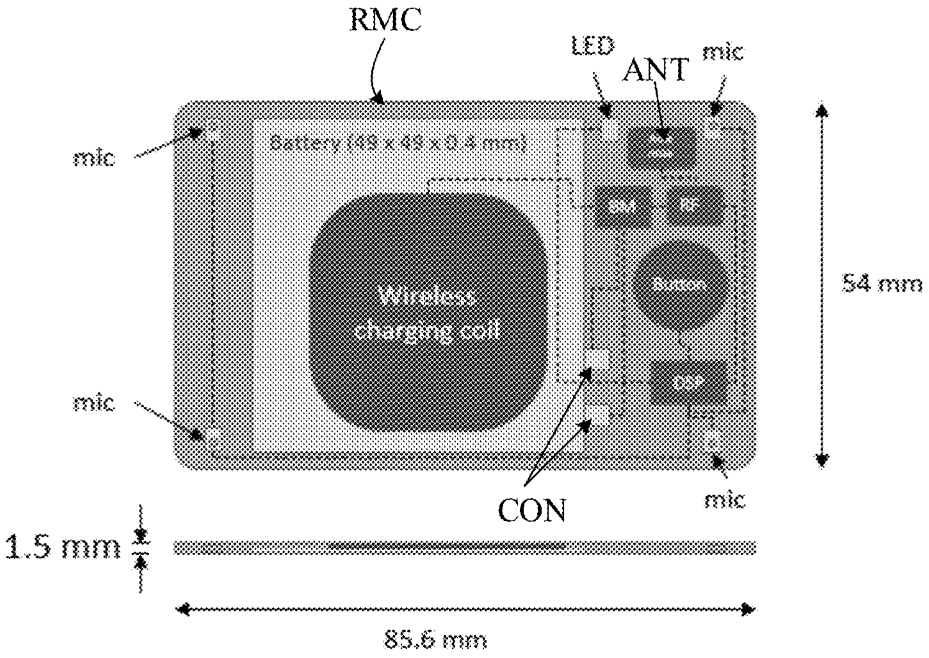

FIG. 2 shows a block diagram of a credit card size remote microphone device (RMC) according to an embodiment of the present disclosure.

A remote microphone device (RMC) according to the present disclosure may be produced using one or more of the following technical features

Figure 3A:
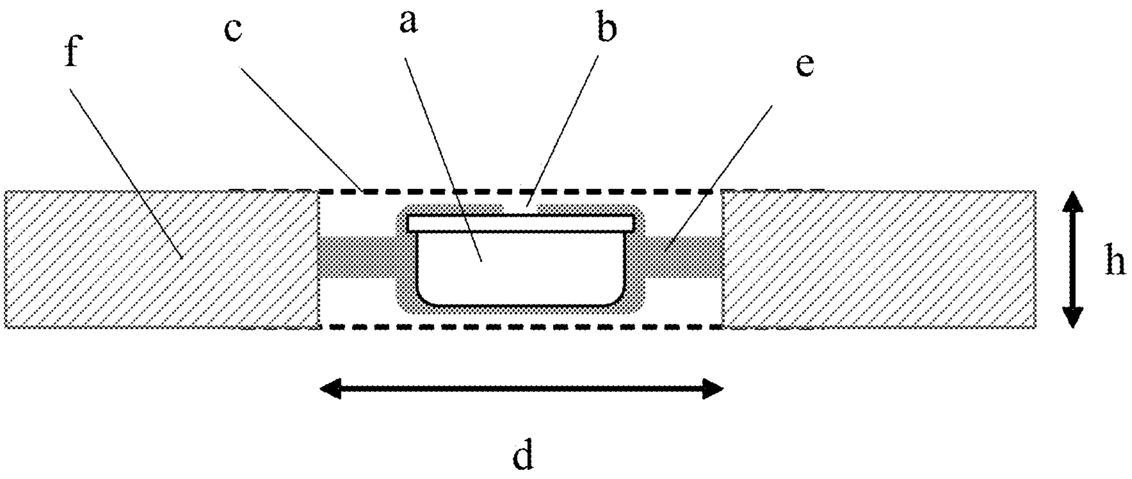
FIG. 3A shows an exemplary microphone suspension design of a emote microphone device according to the present disclosure.
Figure 3B:
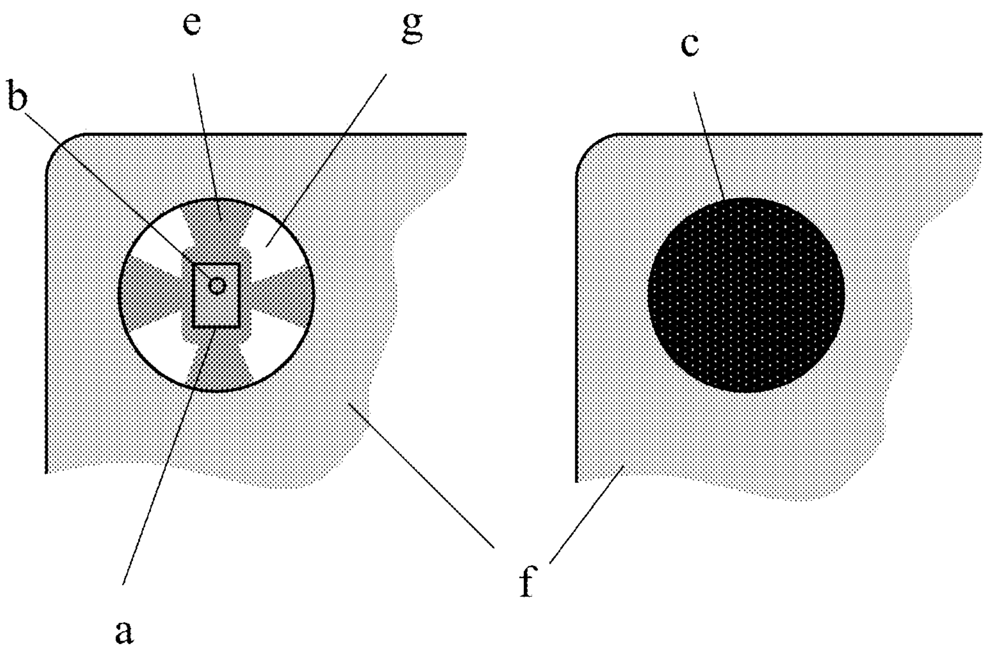
FIG. 3B shows a microphone suspension design (e) with openings (g) to allow for sound to enter from both sides of the card (left part), and a microphone and inlet covered with filter or membrane (c) on both sides of the card (right part)

- Laminating card technology into standard credit card size 85.6×54.0 mm, but e.g. with a larger thickness, e.g. 1.5 mm (where the standard credit card thickness is 0.75 mm), as indicated in FIG. 2.
- MEMS microphones (e.g. four, e.g. one in each 'corner', cf. 'mic' in FIG. 2) having a thickness of approximately 1 mm.
- Vibration attenuation (decoupling) of microphones (possibly based on suspension and/or signal processing), cf. FIG. 3A, 3B.
- Dust protection of microphone inlet(s), cf. '3' in FIG. 3B.
- A battery (e.g. rechargeable, e.g. Li-Ion) having a thickness of approximately 0.4 mm, cf. 'Battery (49×49×0.4 mm)' in FIG. 2.
- A wireless charging coil, e.g. allowing resonant charging from standard chargers (e.g. based on resonant charging, e.g. for mobile telephones, cf. 'Wireless charging coil' in FIG. 2).
- Battery/charge management algorithm for managing the charging (and possibly de-charging) of the rechargeable battery (cf. e.g. 'BM' in FIG. 2 connected between the charging coil and the battery via connecting elements (CON) and appropriate wiring (cf. dashed lines), e.g. on a substrate (e.g. a PCB)).
- Digital audio signal processing, e.g. including beamforming, as known from hearing aids (cf. 'DSP' in FIG. 2).
- Antenna and transceiver circuitry (cf. ANT, RF) for establishing a wireless link to a hearing aid (or a hearing aid system) and/or to an auxiliary device (e.g. a smartphone or remote control device), e.g. via Bluetooth (e.g. Bluetooth Low Energy, such as Bluetooth LE Audio) or UBW.
- An indicator, e.g. a visual indicator, such as an LED, for providing status information to the user.

A remote microphone device (RMC) according to the present disclosure may provide one or more of the following advantages:

- Easy storage for the user. Can be stored in wallet or smartphone cover made for credit card storage.
- Large microphone distance (up to 95 mm, e.g. between 'diagonal' microphones (mic) in FIG. 2), despite being small in volume (6.9 $cm^3$), for better beamforming in lower frequencies. (Current solutions have other form factors, may e.g. have a volume of 25 $cm^3$ and a maximum of 13 mm microphone distance).
- Discreet to use both when held in a hand (cf. FIG. 1), worn in a shirt pocket as a partner microphone or placed on a table as a table microphone.
- Easy to use with simple user interface. Turn on/off (cf. 'Button' in FIG. 2).
- Easy to charge by using standard wireless chargers (e.g. Qi).
- Easy to carry.
- Durable and flexible to use. Card including lithium-Ion battery (or Lithium Polymer) allow being bent, cf. 'Battery (49×49×0.4 mm)' in FIG. 2.
- Long battery use time.
- Bluetooth Low-Energy (BLE) beacon tracking feature for easy localization of lost mic card.

AN EXAMPLE

A remote microphone device (RMC) according to the present disclosure may for example be implemented using:

- 4×MEMS P8AC03 Sonion microphones.
- Dust/moist fitters for microphones.
- Battery Grepow GRP0449049 49.0×49.0×0.4 mm with 48 mAh @3.7 V Capacity.
- Wireless charge coil printed in a flex PCB.
- Radio Frequency (RF) chip for wireless communication (e.g. UWB).

Wireless RF antennae.

Dome Switch for turning on/off the device.

DSP (audio) chip with 4 microphone input channels.

FIG. 3A shows an exemplary side view microphone suspension design of a remote microphone device according to the present disclosure. The microphone (a) (mic in FIG. 2) is mounted in a rubber suspension (e) (or other suitably flexible material), with sound inlet (b), mounted in a cavity or opening (c) in the credit card size casing (f) of the remote microphone device (RMC in FIG. 2). The suspension (e) is designed so that the microphone and suspension do not touch the support (e.g. a table) that the card is placed on (during use of the remote microphone device), to avoid transmission of vibrations from the support to the microphone (a).

The left part of FIG. 3B shows an exemplary top view of the microphone suspension design (e) of FIG. 3A with openings (g) to allow for sound to enter from both sides of the card. A circular opening with four cone shaped support ribs between the microphone unit and the wall of the circular opening in the planar structure of the credit card form remote microphone device. The right part of FIG. 3B illustrates a microphone (mic in FIG. 2) and its inlet covered with a filter (e.g. a dust-filter) or membrane (c) on both sides of the credit card form remote microphone device.

Figure 4:
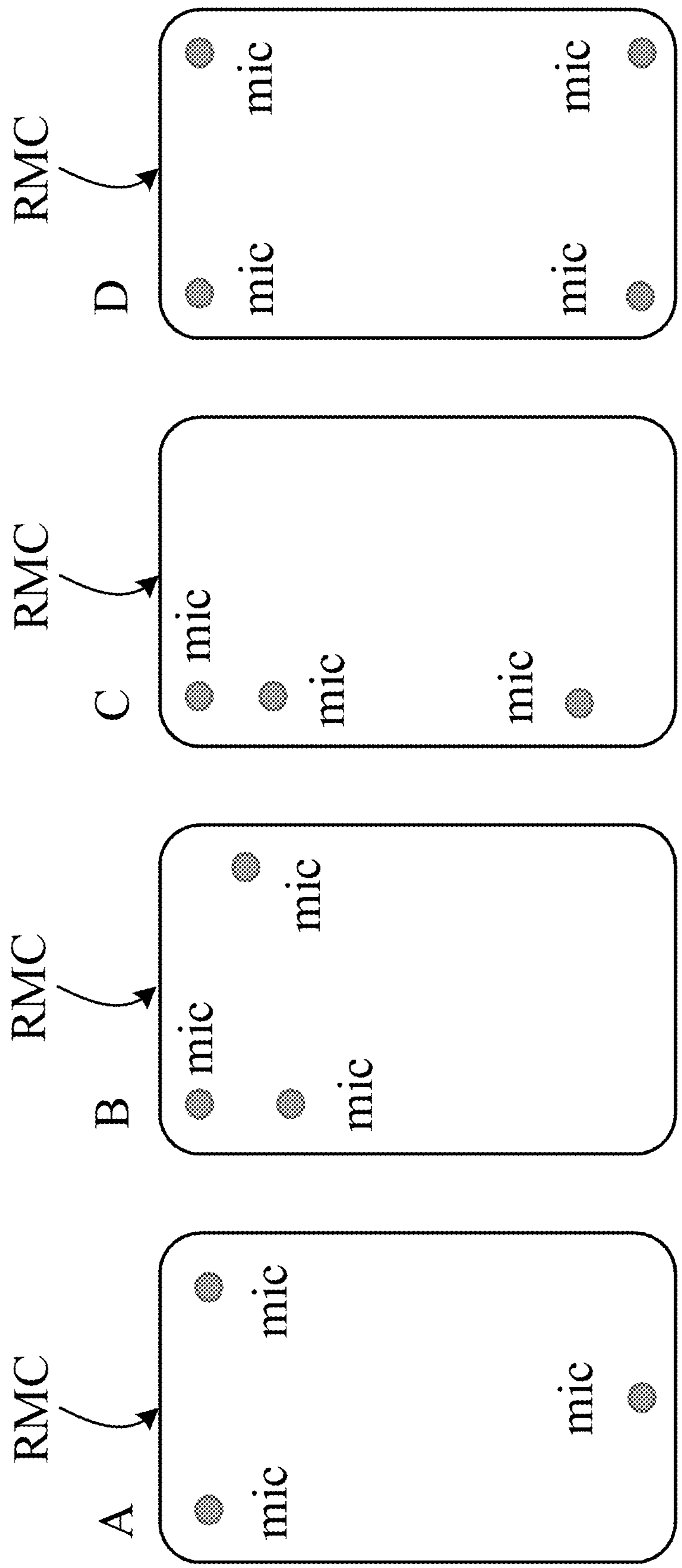
FIG. 4 shows four examples of different possible microphone positions for creating a microphone array in a remote microphone device according to the present disclosure.

FIG. 4 shows four examples (A, B, C, D) of different possible microphone (mic) positions for creating a microphone array in a remote microphone device (RMC) according to the present disclosure. The four examples a remote microphone device (RMC) comprise three (A, B, C) or four microphones (D), respectively. Other numbers may be used (e.g. 2 or 5 or more microphones).

Microphone configuration A has a large microphone distance and may be good at creating a beamformer in many directions. Configuration B has the microphones located in one end of the card, so when the card is held in the hand there is less risk of blocking a microphone inlet with the fingers. Configuration C has the microphone arranged in a line making a good beamformer sensitivity in the axis of the microphone positions, and at variating microphone distances to ensure good performance in a broad frequency range. Configuration D has 4 microphones facilitating a more narrow beamformer performance than 3 microphones. The number of microphones may be increased for even better beamforming performance.

Figure 5A:
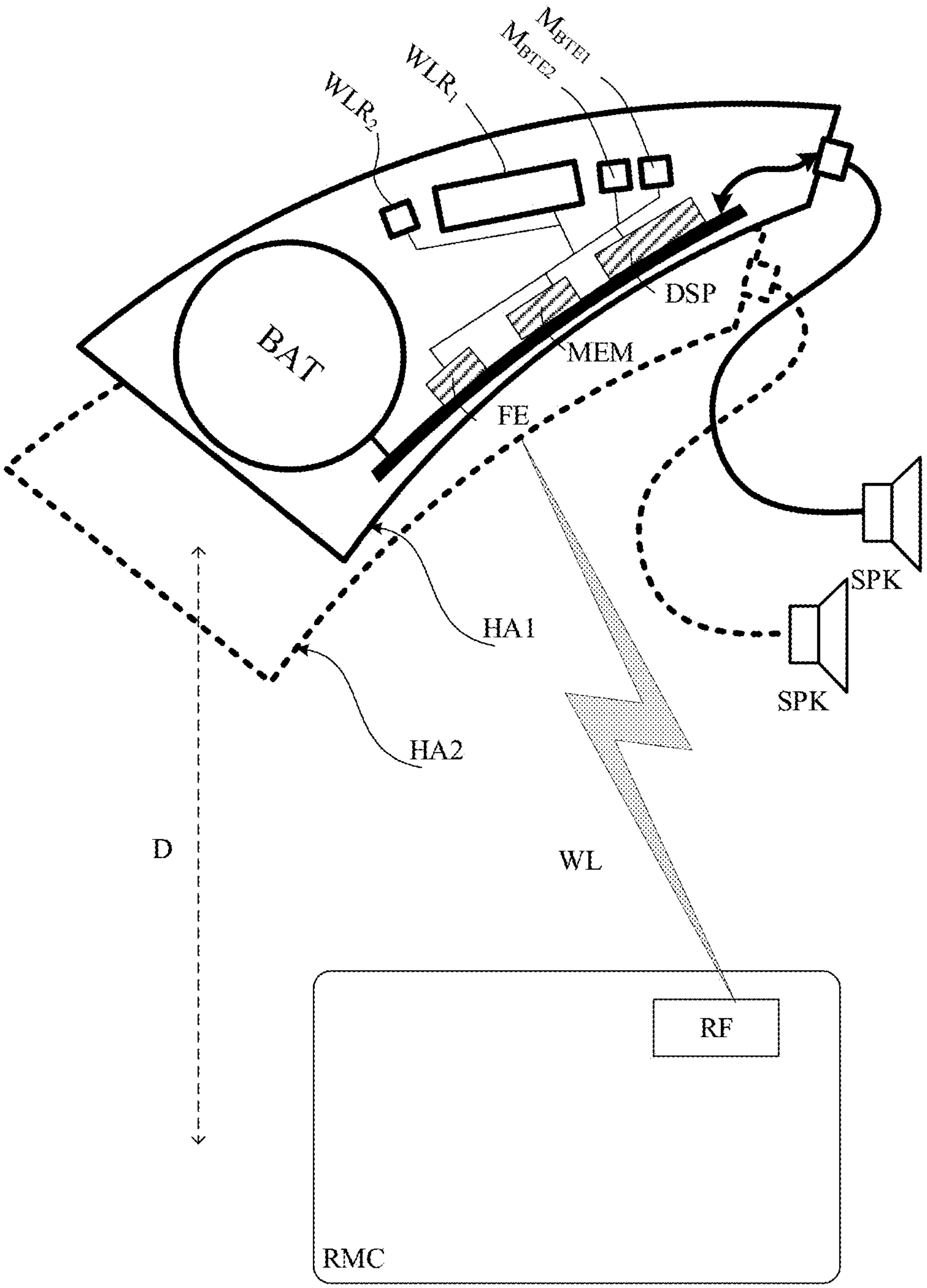
FIG. 5A shows a binaural hearing aid system comprising a remote microphone device according to the present disclosure.

FIG. 5A shows a binaural hearing aid system comprising a remote microphone device according to the present disclosure.

The remote microphone device (RMC) comprises (antenna and) transceiver circuitry (RF) for establishing a communication link (WL) to the hearing aid(s). The remote microphone device (RMC) may e.g. comprise one or more sensors for classifying the environment around the it, in addition to the microphones, e.g. for of estimating background noise, or vibrations in the emote microphone device. The communication link (WL) may have a limited range of operation. In other words, the distance (D) between the hearing aids (HA1, HA2) and the emote microphone device must be below a critical distance ($D_{max}$, depending on the transmit power and the technology used for establishing the link) to establish or maintain the the communication link (WL). The communication link (WL) may e.g. be based on Bluetooth (e.g. Bluetooth Low Energy, such as Bluetooth LE Audio) or UWB.

Figure 5B:
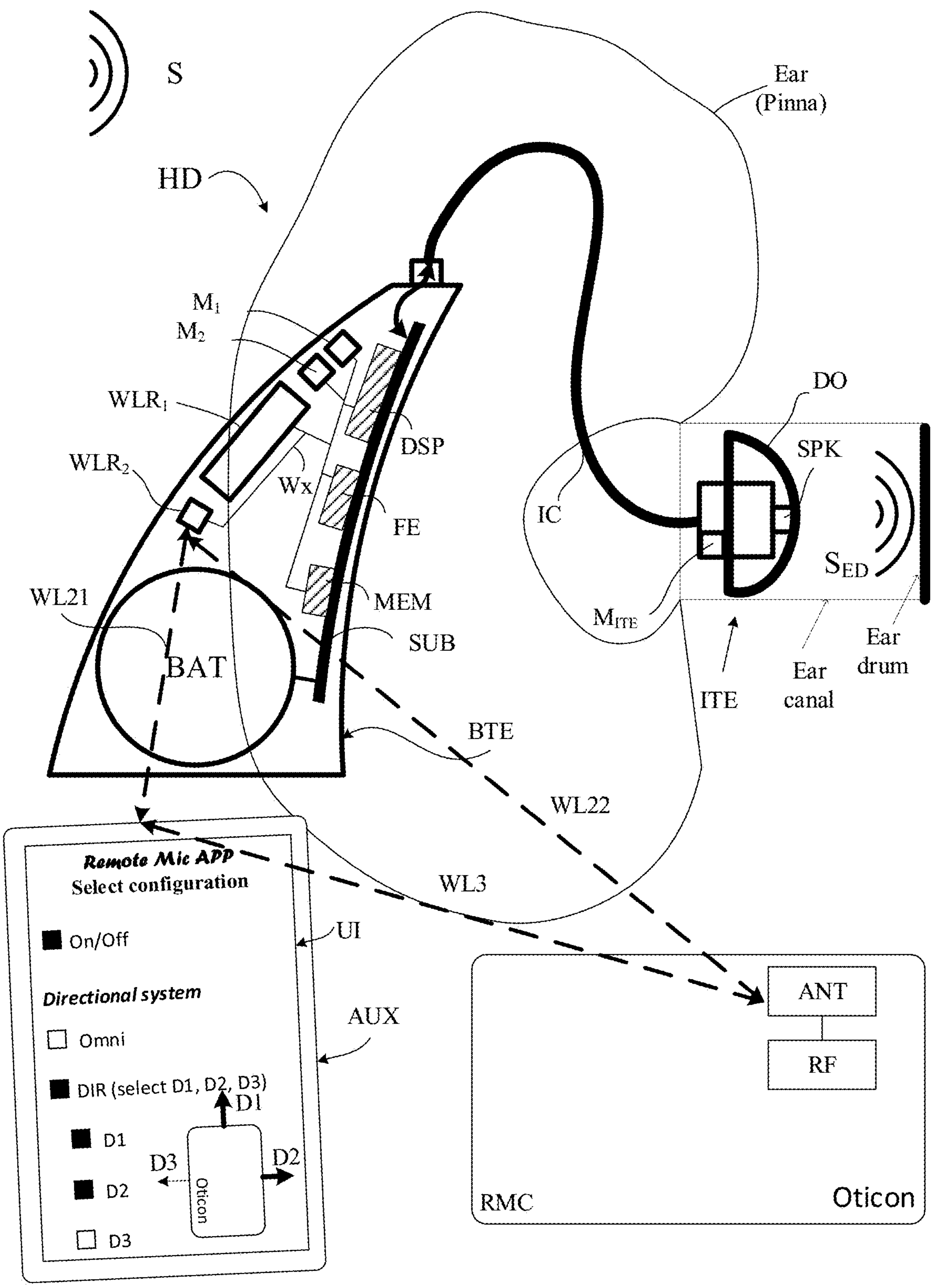
FIG. 5B shows a hearing aid system comprising a remote microphone device in communication with an auxiliary device according to the present disclosure.

FIG. 5B shows a hearing aid system comprising a remote microphone device in communication with an auxiliary device according to the present disclosure. FIG. 5B shows an embodiment of a hearing aid (HD) comprising a BTE-part (BTE) located behind an ear or a user and an ITE part (ITE) located in an ear canal of the user, and an auxiliary device (AD), and a remote microphone device (RMC) according to the present disclosure in communication with each other (via wireless communication links WL21, WL22, WL3, respectively). The auxiliary device comprising a user interface (UI) for controlling the hearing aid and optionally the remote microphone unit (RMC). Together, the hearing aid (HA) and the auxiliary device (AD) may constitute a hearing system according to the present disclosure.

FIG. 5B (and 5A) illustrates an exemplary hearing aid (HD) formed as a receiver in the ear (RITE) type hearing aid comprising a BTE-part (BTE) adapted for being located behind pinna and a part (ITE) comprising an output transducer (SPK, e.g. a loudspeaker/receiver) adapted for being located in an ear canal (Ear canal) of the user. The BTE-part (BTE) and the ITE-part (ITE) are connected (e.g. electrically connected, e.g. via a cable comprising a multitude of conductors, e.g. three or more, such as six or more) by a connecting element (IC). In the embodiment of a hearing aid of FIG. 5B (and 5A), the BTE part (BTE) comprises two input transducers (here microphones) ($M_{BTE1}$, $M_{BTE2}$) each for providing an electric input audio signal representative of an input sound signal from the environment (in the scenario of FIG. 5B, from sound source S, e.g. a communication partner). The hearing aid (HD) of FIG. 5B (and 5A) further comprises two wireless transceivers ($WLR_1$, $WLR_2$) for receiving and/or transmitting signals (e.g. comprising audio and/or information, e.g. audio data and/or control signals according to the present disclosure). The hearing aid (HD) further comprises a substrate (SUB) whereon a number of electronic components are mounted, functionally partitioned according to the application in question (analogue, digital, passive components, etc.), but including a configurable digital signal processor (DSP), a front-end chip (FE), and a memory unit (MEM) coupled to each other and to input and output units via electrical conductors Wx. The mentioned functional units (as well as other components) may be partitioned in circuits and components according to the application in question (e.g. with a view to size, power consumption, analogue vs digital processing, etc.), e.g. integrated in one or more integrated circuits, or as a combination of one or more integrated circuits and one or more separate electronic components (e.g. inductor, capacitor, etc.). The configurable signal processor (DSP) provides an enhanced audio signal (e.g. intended to compensate for a hearing impairment of the user), which is presented to the user. The front-end integrated circuit (FE) is adapted for providing an interface between the configurable signal processor (DSP) and the input and output transducers, etc., and typically comprising interfaces between analogue and digital signals. The input and output transducers may be individual separate components, or integrated (e.g. MEMS-based) with other electronic circuitry. In the embodiment of a hearing aid in FIG. 5B, the ITE part (ITE) comprises an output unit in the form of a loudspeaker (receiver) (SPK) for converting the electric signal (OUT) to an acoustic signal (providing, or contributing to, acoustic signal $S_{ED}$ at the ear drum (Ear drum). The ITE-part further comprises an input unit comprising an input transducer (e.g. a microphone) ($M_{ITE}$) for providing an electric input audio signal representative of an input sound signal $S_{ITE}$ from the environment at or in the ear canal. In another embodiment, the hearing aid may comprise only the BTE-microphones ($M_{BTE1}$, $M_{BTE2}$). In yet another embodiment, the hearing aid may comprise an input unit located elsewhere than at the ear canal (e.g. facing the eardrum) in combination with one or more input units located in the BTE-part and/or the ITE-part. The ITE-part further comprises a guiding element, e.g. a dome, (DO) for guiding and positioning the ITE-part in the ear canal of the user.

The hearing aid (HD) exemplified in FIG. 5B (and 5A) is a portable device and further comprises a battery (BAT) for energizing electronic components of the BTE- and ITE-parts.

The hearing aid (HD) may comprise a directional microphone system (e.g. a beamformer filter) adapted to enhance a target acoustic source among a multitude of acoustic sources in the local environment of the user wearing the hearing aid.

The hearing aid of FIG. 5B (and 5A) may constitute or form part of a binaural hearing aid system according to the present disclosure.

The hearing aid (HD) according to the present disclosure may comprise a user interface (UI), e.g. as shown in the bottom part of FIG. 5B implemented in an auxiliary device (AD), e.g. a remote control, e.g. implemented as an APP in a smartphone or other portable (or stationary) electronic device (e.g. a charging station). The hearing aid system may be configured to allow the user to control functionality of the hearing aid system, e.g. the hearing aid (HD) via the user interface (UI) (e.g. via communication link WL21). It may, however, also be configured to allow the user to control functionality of the remote microphone (RMC) via the user interface (UI) (e.g. via communication link WL3). In the embodiment of FIG. 5B, the screen of the user interface (UI) illustrates a Remote Mic APP. The user may configure the remote microphone device (RMC) via the APP. The user may e.g. switch the remote microphone device on or off (as indicated by the filled square symbol ■ next to 'On/off' indication on the screen). The user may e.g. further select activation of beamforming (as indicated by the filled square symbol ■ next to 'DIR (select D1, D2, D3)' indication on the screen under the hearing 'Directional system'). The user may when directional system is activated select directions relative to the credit card form of the remote microphone device in which (e.g. fixed) beamformers should be directed. In the example of FIG. 5B, directions D1 and D2 have been selected (as indicated by the filled square symbol ■ next to 'D1' and 'D2' (and bold arrows D1, D2)). Unselected options are indicated by open square symbols (□) (cf. e.g. direction D3 and the option 'Omni' instead of 'DIR'). The Remote Mic APP May e.g. be offered as an alternative (or in additional) to activation elements located on the remote microphone device (RMC).

The communication links WL21, WL22, WL3 may e.g. be based on far field communication, e.g. Bluetooth or Bluetooth Low Energy, e.g. Bluetooth LE Audio (or similar technology, e.g. UWB), implemented by appropriate antenna and transceiver circuitry in the hearing aid (HD) in the auxiliary device (AD), and in the remote microphone device (RMC), as indicated by transceiver unit ($WLR_2$) in the hearing aid, and (ANT, RF) in the remote microphone device (RMC).

The hearing system may be configured to allow the audio data picked up by the remote microphone device (RMC) to be transmitted to the hearing aid (HD) via a communication link (WL22) (and/or to the auxiliary device (AD) via a communication link (WL3).

Figure 6:
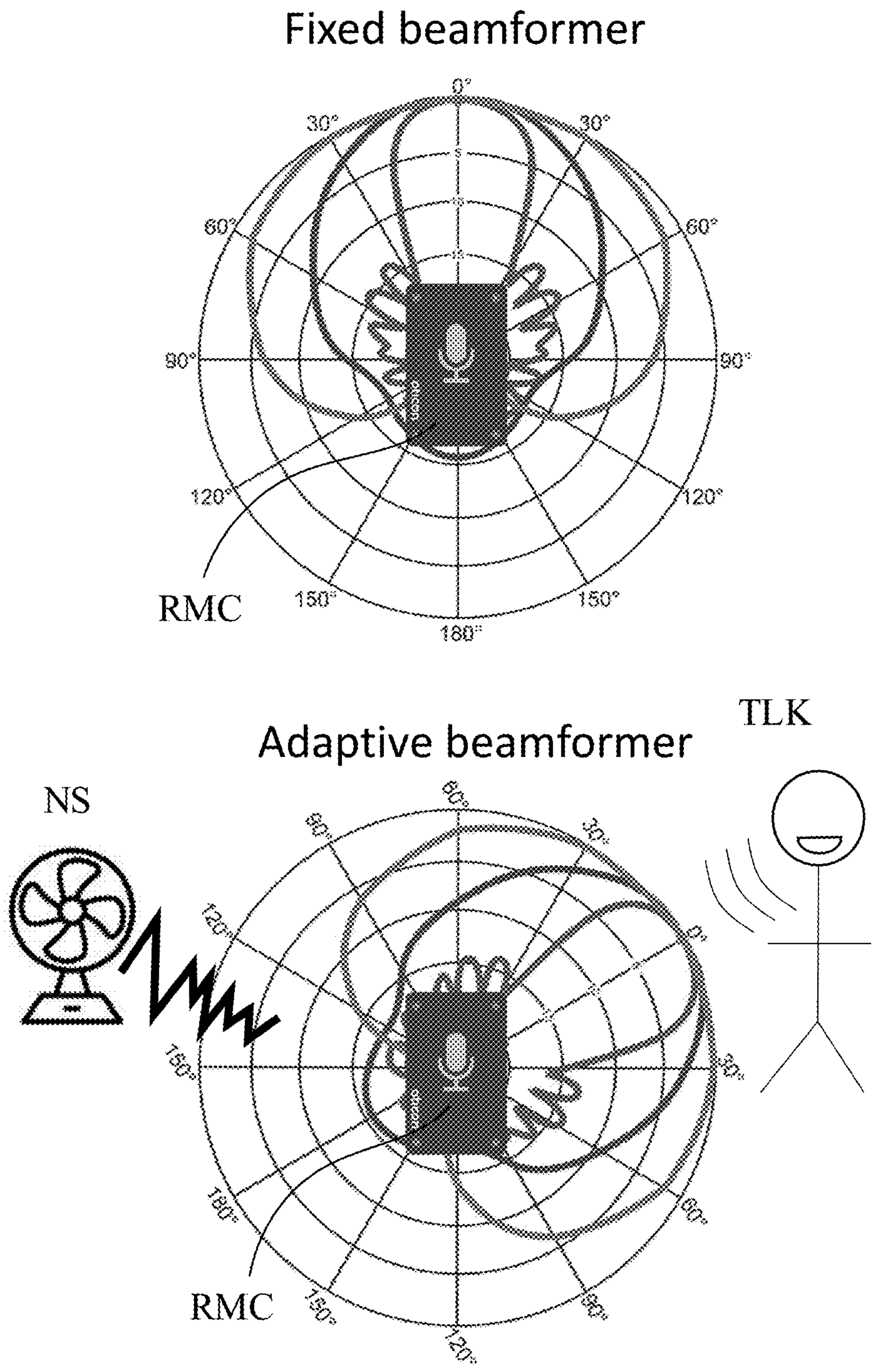
FIG. 6 shows two different beamformer scenarios of a remote microphone device according to the present disclosure.

FIG. 6 shows two different beamformer scenarios of a remote microphone device (RMC) comprising a multitude of microphones according to the present disclosure, the top part, denoted 'Fixed beamformer', illustrating (relative) enhancement of sounds (e.g. a speaker) in one (fixed) direction, and the bottom part, denoted 'Adaptive beamformer', illustrating (relative) enhancement of sounds (e.g. a speaker) in any direction (relative to the orientation of the remote microphone device (RMC)).

The top part (denoted 'Fixed beamformer') of FIG. 6 illustrates three different beamformers, all having a fixed target direction (e.g. in a direction as indicated by the microphone symbol on the remote microphone device (RMC)) for which the directional system has maximum sensitivity and fixed or adaptive attenuation of sound from other directions than the target direction. Such beamformers may e.g. be implemented in dependence of a multitude of electric input signals from a microphone array of the remote microphone device (RMC) and fixed beamformer filter coefficients or adaptively updated filter coefficients that are updated when no speech is present in the microphone signals (as e.g. indicated by a voice activity detector), to thereby adapt to a changing noise field (while keeping the target direction fixed).

The bottom part (denoted 'Adaptive beamformer') of FIG. 6 illustrates three different beamformers, having an adaptive target direction (here a direction towards a (target) speaker (TLK)) for which the directional system has maximum sensitivity and adaptive attenuation of sound from other directions than the target direction. Such beamformers may be implemented in dependence of a multitude of electric input signals from the microphone array of the remote microphone device (RMC) and adaptively updated filter coefficients. The beamformer filter coefficients may e.g. be updated, respectively, when speech is present (to update a target direction/location, e.g. update a steering vector) and when no speech is present (to update the noise field, e.g. varying or (relatively) moving noise sources, cf. noise source (NS) in FIG. 6, e.g. update a noise covariance) in the microphone signals (as e.g. indicated by a voice activity detector). Various aspects of beamforming is e.g. discussed in [Brandstein & Ward; 2001].

Figure 7B:
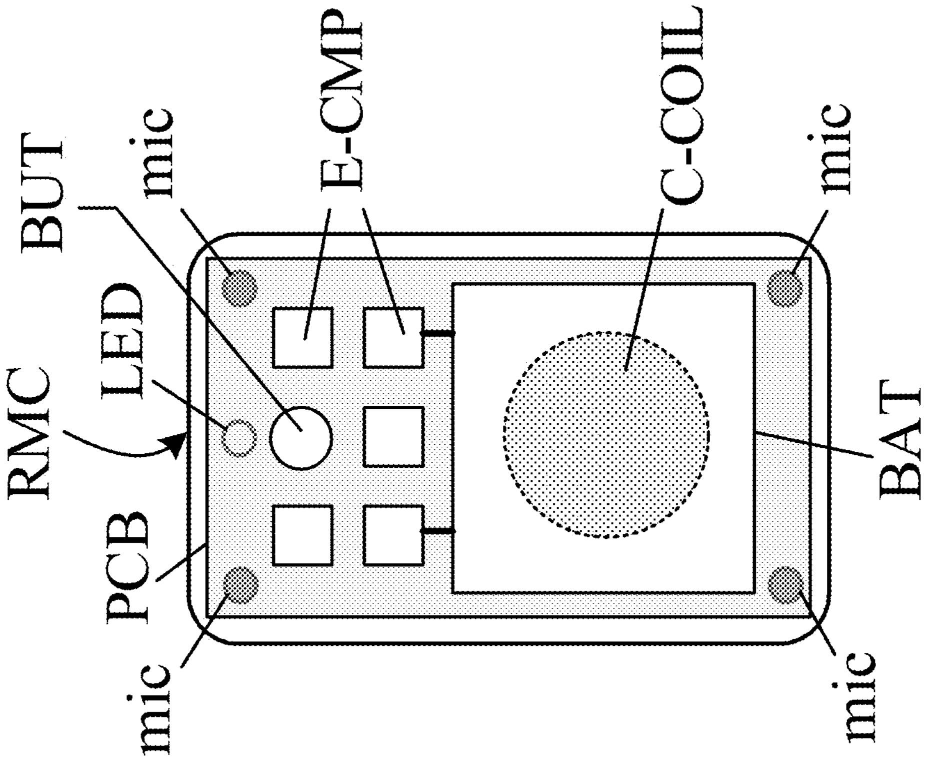
FIG. 7B shows a second exemplary arrangement of components and battery in a remote microphone device according to the present disclosure, and FIG. 8 schematically shows a in a vertical cross-sectional view ('z-direction' perpendicular to the planar surfaces) of a part of the remote microphone device according to the present disclosure comprising details of a MEMS microphone inlet.
Figure 7A:
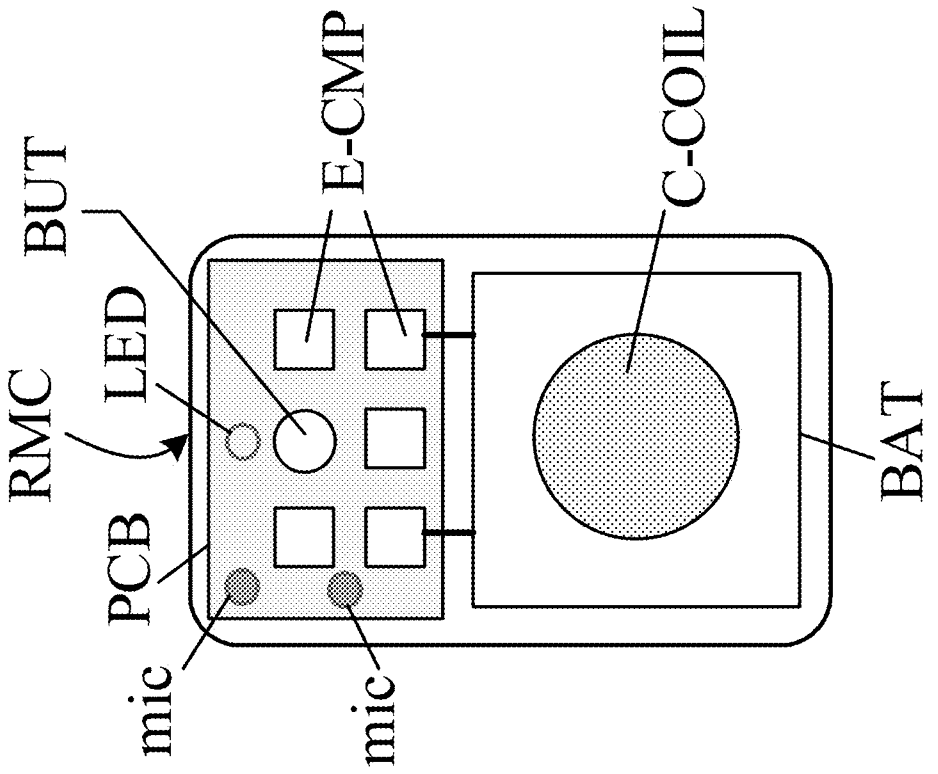
FIG. 7A shows a first exemplary arrangement of components and battery in a remote microphone device according to the present disclosure.

FIG. 7A shows a first exemplary arrangement of components (E-CMP, mic, BUT, LED) and battery (BAT) in a remote microphone device (RMC) according to the present disclosure. In the embodiment of FIG. 7A, the components, comprising electronic components (E-CMP), (two) microphones, a button (BUT) and a light emitting diode (LED) are assembled on a common substrate, here a printed circuit board (PCB). The PCB comprising the components extend over a first part of the casing (having outer surfaces that constitutes the outer limits of the remote microphone device). In the embodiment of FIG. 7A the battery (BAT) extends over a second part of casing. The PCB and the battery (first and second parts) of the embodiment of FIG. 7A are non-overlapping (to keep the thickness of the casing at a minimum. The charging coil (C-COIL) for wirelessly charging the battery is located on the battery housing (but electrically isolated therefrom) and electrically connected to terminals of the battery. An electro-magnetic shield (e.g. a ferrite layer) is preferably located between the coil and the battery housing to avoid heating of the battery housing during wireless charging. The battery is connected to the PCB and components thereon to provide the necessary power to operate the remote microphone device (RMC). In the embodiment of FIG. 7A, two microphones (mic) are located along one of the sides (here the longest side) of the casing of the device. In other words, the microphone axis of the two microphones is parallel to the longest side of the casing. Thereby, a beamformer of the remote microphone device (RMC) may be arranged to provide its maximum sensitivity in a direction parallel to the longest side of the casing. In other words, the remote microphone device (RMC) may be easily oriented to pick up sound from a known direction (e.g. the users voice by arranging the device (e.g. in a shirt pocket) so that it 'points' in a direction of the user's mouth).

The dimensions of the credit card size remote microphone device (RMC) are in the planar (x,y) directions approximately x=53.98 mm+/−5%, y=85.6 mm+/−5% and perpendicular (z) to the to the planar directions having a thickness of less than or equal to 2 mm. The housing may preferably be constituted by a plastic material (e.g. of the same kind used for credit cards or bank cards comprising electronic components). The components and battery of the remote microphone device (RMC) may thus be embedded in the plastic material. During production, care should be taken to avoid or minimize the flow of that filler (plastic) material into cavities around microphone inlets and button (e.g. a dome switch). This may e.g. be achieved by covering the microphone inlets with a protecting layer allowing sound to reach the microphone membrane while allowing a hermetically sealed (and thus water resistant, or water proof, casing to be provided (e.g. according to IP67, or IP68, or IP69). Hermetic sealing has the advantage of minimizing the damage of electronic components of the remote microphone device (RMC) due to penetration of water or other electrically conducting or corroding liquids, and/or due to dust or other materials occluding the microphone inlets, etc. In addition to a sealing layer, the microphone inlets may additionally be provided with a mechanical (e.g. web-like) filter as the outermost protection against occlusion. Additionally, the outer surfaces (and/or the filters protecting the microphone inlets) may be fully or partially coated with a hydrophobic coating to minimize adherence of liquids to the surfaces of the casing (or filters). The microphone inlets may be provided only from one of the planar surfaces of the casing of the remote microphone device (RMC), e.g. the opposite side from which the activation element (e.g. a dome switch button) is accessible. Thereby the microphones (e.g. MEMS microphones) may be appropriately mounted on the PCB, so that the microphone inlet is accessible via an opening in the PCB.

FIG. 7B shows a second exemplary arrangement of components and battery in a remote microphone device according to the present disclosure comprising the same components as the embodiment of FIG. 7A. In the embodiment of FIG. 7B, however, the PCB extends below or above the battery to allow the charging coil to be located there on, and if the PCB extends beneath the battery creates room for additional microphones at the bottom end of the card (cf. two microphones (mic) located in the lower corners of the device (lower being defined relative to the orientation of the card shown in FIG. 7A, 7B). The embodiment of FIG. 7B this comprises four microphones, each being located in a corner of the device. Thereby a flexible (e.g. adaptive) beamformer may be provided that it able to have its maximum and minimum sensitivities in all directions of a plane extending the plane defined by the credit card form casing of the device. The two lower microphones are arranged on the same side of the PCB as the other components described in connection with FIG. 7A (to keep the thickness of the casing at a minimum). Again, a layer of an electromagnetically shielding material may preferably be added between the charging coil (C-COIL) and the battery (BAT).

An advantage of the remote microphone device (RMC) as described is that is does not comprise any electric connectors. All communication to and from the card may be wireless. Likewise, charging of the rechargeable battery and programming or firmware updates may all be provided wirelessly.

Figure 8:
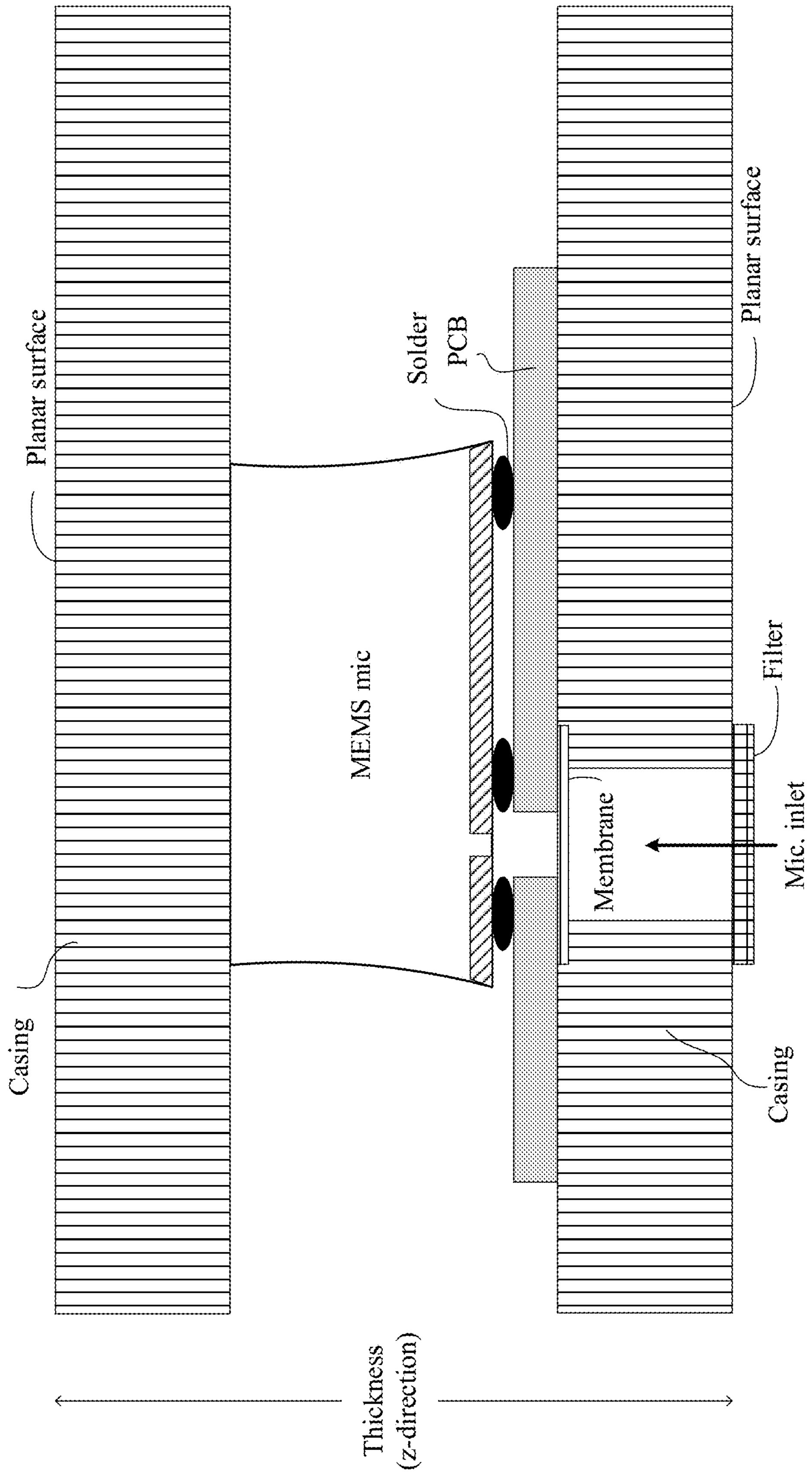

FIG. 8 schematically shows a in a vertical cross-sectional view ('z-direction' perpendicular to the planar surfaces) of a part of the remote microphone device according to the present disclosure comprising details of a MEMS microphone inlet. FIG. 8 shows a cross-section where the two planar outer surfaces of the casing are indicated. The mutual distance between the two planar surfaces represents the 'thickness' (in a z-direction perpendicular to the planar surfaces) of the remote microphone device. The thickness may e.g. be limited to a predefined tolerated thickness, e.g. to be smaller than or equal to 3 mm, such as smaller than or equal to 2 mm. The MEMS microphone (MEMS mic) is shown to be soldered to a printed circuit board (PCB) via solder dots (cf. black elliptic structures denoted 'solder'). An opening (e.g. circular) is arranged in the PCB (e.g. larger than the microphone inlet of the MEMS microphone itself), and a further opening is arranged in the casing to allow sound to reach a membrane of the MEMS microphone through the thereby created microphone inlet. A sealing membrane (Membrane) is shown to cover the opening in the PCB and to provide a certain amount of water resistance while being predominantly acoustically transparent. The membrane is shown to be located in the opposite side of the PCB compared to the mounting of the MEMS microphone. Thereby it is protected from the direct heat used when soldering the component to the PCB and protects the inlet of the MEMS microphone during the 'enclosure process where the casing is applied to the PCB, battery and components of the remote microphone device (which may also involve flow of plastic material). A further protection of the microphone inlet is indicated in the form of a mesh-filter (Filter) for limiting the entrance of dust and other particles. The plastic casing ('casing') is (schematically) shown to have outer as well as inner parallel surfaces. In practice the inner surfaces may be adapted to the enclosed structures (e.g. during assembly (e.g. involving heating) of the casing to enclose the components and battery of the device).

Embodiments of the disclosure may e.g. be useful in applications such as hearing aids or headsets.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

WO1994020951A1 (Walters & Agarwal) 15 Sep. 1994

U.S. Pat. No. 7,006,846B2 12 Sep. 2002 (Northrup Grumman Corporation)

[Brandstein & Ward; 2001]M. Brandstein and D. Ward, Eds., "Microphone Arrays: Signal Processing, Techniques and Applications", Springer 2001.

The invention claimed is:

1. A remote microphone device for a hearing aid system, the remote microphone device comprising:

a multitude of microphones, each providing an electric input signal representing sound in the environment of the microphone device, thereby providing a corresponding multitude of electric input signals;

a digital signal processor for providing a processed signal in dependence of said multitude of electric input signals, the processor comprising a noise reduction system comprising:

at least one beamformer for providing a spatially filtered signal in dependence of said multitude of electric input signals, or signals originating therefrom; and beamformer filter coefficients, said beamformer filter coefficients being determined in dependence of a steering vector comprising as elements respective acoustic transfer functions from a target signal to each of said multitude of input transducers or acoustic transfer functions from a reference input transducer among said multitude of input transducers to each of the remaining input transducers;

a wireless communication interface comprising antenna and transceiver circuitry allowing the remote microphone device to transmit said processed signal comprising said spatially filtered signal or a further processed version thereof to said hearing aid system;

a rechargeable battery;

wherein said remote microphone device comprises a casing having a planar structure with a form and size as a standard credit card; and comprises a user interface configured to allow a user to control functionality of the remote microphone device in dependence of one or more activation elements, wherein at least some of said multitude of microphones are located in corners of said standard credit card form.

2. The remote microphone device according to claim 1 wherein said one or more activation elements comprises one or more buttons.

3. The remote microphone device according to claim 1 wherein said user interface comprises a voice control interface allowing the user to control the functionality of the remote microphone device by spoken commands.

4. The remote microphone device according to claim 1 wherein said user interface comprises one or more indicators for providing feedback to the user about a current status of the remote microphone device.

5. The remote microphone device according to claim 1 comprising a sensor allowing to detect an orientation of the remote microphone device.

6. The remote microphone device according to claim 5 configured to enter an omni-directional mode of operation in case its planar orientation is perpendicular to the force of gravity of the earth.

7. The remote microphone device according to claim 1 configured to determine which of the two planar outer surfaces (x,y) of the casing of the device is presently facing upwards when the device is resting on a planar, horizontal, carrier.

8. The remote microphone device according to claim 1 configured to exchange information with a further remote device.

9. A remote microphone device for a hearing aid system, the remote microphone device comprising:

a multitude of microphones, each providing an electric input signal representing sound in the environment of the microphone device, thereby providing a corresponding multitude of electric input signals;

a digital signal processor for providing a processed signal in dependence of said multitude of electric input signals, the processor comprising a noise reduction system comprising:

at least one beamformer for providing a spatially filtered signal in dependence of said multitude of electric input signals, or signals originating therefrom; and beamformer filter coefficients, said beamformer filter coefficients being determined in dependence of a steering vector comprising as elements respective acoustic transfer functions from a target signal to each of said multitude of input transducers or acoustic transfer functions from a reference input transducer among said multitude of input transducers to each of the remaining input transducers;

a wireless communication interface comprising antenna and transceiver circuitry allowing the remote microphone device to transmit said processed signal comprising said spatially filtered signal or a further processed version thereof to said hearing aid system;

a rechargeable battery;

wherein said remote microphone device comprises a casing having a planar structure with a form and size as a standard credit card; and comprises a user interface configured to allow a user to control functionality of the remote microphone device in dependence of one or more activation elements, wherein each of the multitude of microphones is mounted in a suspension comprising a flexible material in a cavity or opening in the credit card size casing of the remote microphone device.

10. The remote microphone device according to claim 1 wherein a microphone inlet of one of said multitude of microphones is covered with a filter or membrane.

11. The remote microphone device according to claim 10 comprising a membrane for providing an acoustically transparent closure.

12. The remote microphone device according to claim 10 wherein the membrane is placed in the casing on a substrate where the one of said multitude of microphones is located.

13. The remote microphone device according to claim 12 wherein the microphones are mounted on the substrate to have a microphone inlet opening facing a first surface of the substrate, and wherein the substrate comprises an opening concentrical with the microphone inlet opening, and wherein membrane is placed on the opposite, second surface of the substrate covering said opening in the substrate.

14. The remote microphone device according to claim 1 comprising a charging coil configured to wirelessly receive charging energy from an external charging device allowing said charging coil to charge said rechargeable battery.

15. A remote microphone device for a hearing aid system, the remote microphone device comprising:

a multitude of microphones, each providing an electric input signal representing sound in the environment of the microphone device, thereby providing a corresponding multitude of electric input signals;

a digital signal processor for providing a processed signal in dependence of said multitude of electric input signals, the processor comprising a noise reduction system comprising:

at least one beamformer for providing a spatially filtered signal in dependence of said multitude of electric input signals, or signals originating therefrom; and beamformer filter coefficients, said beamformer filter coefficients being determined in dependence of a steering vector comprising as elements respective acoustic transfer functions from a target signal to each of said multitude of input transducers or acoustic transfer functions from a reference input transducer among said multitude of input transducers to each of the remaining input transducers;

a wireless communication interface comprising antenna and transceiver circuitry allowing the remote microphone device to transmit said processed signal comprising said spatially filtered signal or a further processed version thereof to said hearing aid system;

a rechargeable battery;

wherein said remote microphone device comprises a casing having a planar structure with a form and size as a standard credit card; and comprises a user interface configured to allow a user to control functionality of the remote microphone device in dependence of one or more activation elements, wherein said remote microphone device further comprises a charging coil configured to wirelessly receive charging energy from an external charging device allowing said charging coil to charge said rechargeable battery, and wherein the charging coil is located on the battery, separated from a battery housing by an electromagnetically shielding layer.

16. The remote microphone device according to claim 1 wherein said casing has a dimension of less than or equal to 2 mm in a direction perpendicular to its planar surfaces.

17. A hearing aid system comprising at least one hearing aid and a remote microphone device according to claim 1.

18. The hearing aid system according to claim 17, adapted to establish a communication link between the remote microphone device and an auxiliary device to provide that data can be exchanged or forwarded from one to the other.

19. The hearing aid system according to claim 18 comprising a user interface—implemented in the auxiliary device—for controlling the hearing aid system.

* * * * *